United States Patent [19]

Brunk

[11] Patent Number: 4,839,793

[45] Date of Patent: Jun. 13, 1989

[54] MULTIPLE COMPUTER INTERFACE

[75] Inventor: John L. Brunk, Brighton, Mich.

[73] Assignee: Baytec, Inc., Livonia, Mich.

[21] Appl. No.: 68,946

[22] Filed: Jul. 1, 1987

[51] Int. Cl.$^4$ ............................................. G06F 15/16
[52] U.S. Cl. .................................. 364/200; 364/228.3; 364/242.94
[58] Field of Search ......................................... 364/200

[56] References Cited

U.S. PATENT DOCUMENTS

| | | | |
|---|---|---|---|
| 4,484,273 | 11/1984 | Stiffler et al. | 364/200 |
| 4,586,133 | 4/1986 | Steckler | 364/200 |
| 4,608,631 | 8/1986 | Stiffler et al. | 364/200 |
| 4,631,667 | 12/1986 | Zulian et al. | 364/200 |

Primary Examiner—Raulfe B. Zache
Attorney, Agent, or Firm—Basile and Hanlon

[57] ABSTRACT

A multiple computer interface for connecting a plurality of computers in a network system. The interface interconnects a plurality of computers or central processing units to a main computer control arrangement comprising a central processing unit, main memory storage for shared programs as well as peripheral I/O devices, such as printers. Separate directly addressable control processing units are provided for inputs as well as controlling various output devices such as printers.

3 Claims, 3 Drawing Sheets

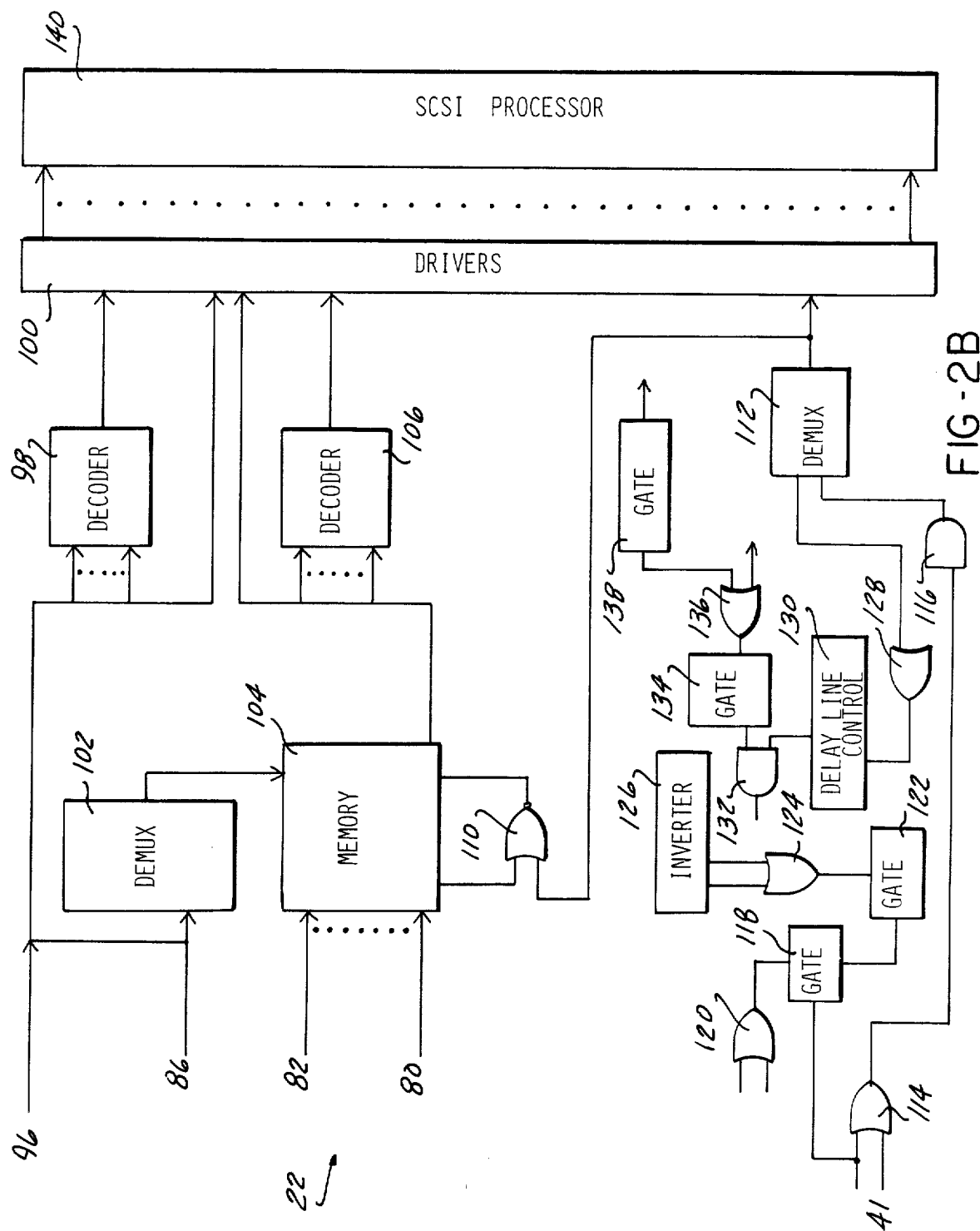

MULTIPLE COMPUTER INTERFACE

BACKGROUND OF THE INVENTION

1. Field of the Invention

This invention relates in general to computer network interfaces for interconnecting multiple computers in a network system for access to stored common programs, such as, financial, word processing, etc.

2. Description of the Prior Art

The computers are interconnected through each user and the network via a common network allowing immediate access to the shared programs. However, such previously devised network systems access each individual computer separately in a priority manner and delay data access to other computers on the network until the previous function has been performed on the access computer. This decreases data processing time as well as delaying access to central files and printing facilities.

What is needed is a multiple computer interface system which overcomes the problems encountered with previous multiple computer networks. What is also needed is a multiple computer interface which provides immediate and simultaneous loading capacity and access to individual computers on the interconnected network.

SUMMARY OF THE INVENTION

The present invention is a multiple computer interface system connecting multiple computers in a single network or system. The interface is connected through a single bus to a central processing unit or CPU. The CPU operates under a stored control program to control the entire network operating multiple printers and input stations, a memory unit comprised of multiple hard disks and/or tapes, as well as the individual network computer controller. Each of the controllers operates under separate firm ware and a stored program which enables the central processing unit to load each printer, memory device or individual computer with data or receive data therefrom simultaneously after each load operation and continue with programmed instructions while the individual controller is continuing with its individual operation having recently received instructions from the main or first controller.

In an optional mode, a hard disk may be programmed for each individual controller and sectioned for each controller thereby allowing access from the main CPU for each individual controller and computer on the network. This allows information to be transferred instantaneously from the main CPU to each controller and attached computer. This overcomes many of the problems encountered with previously devised networking systems which only allowed access to each computer rather than immediate loading of multiple computers with the desired information from the central processing unit.

The present system enables a control program to be immediately loaded into a controller's or computer's memory instantaneously before accessing a second computer if necessary. This allows the first computer or input/output device, such as a computer, printer, etc. to proceed with its operation while the remaining system continues in immediate fashion.

BRIEF DESCRIPTION OF THE DRAWING

Embodiments of the invention are described in greater detail hereinafter relative to the drawing in which:

FIGS. 2a and 2b constitute the circuit diagram of the multiple computer system interface (SCSI) controller.

DESCRIPTION OF THE PREFERRED EMBODIMENTS

Figure 1:
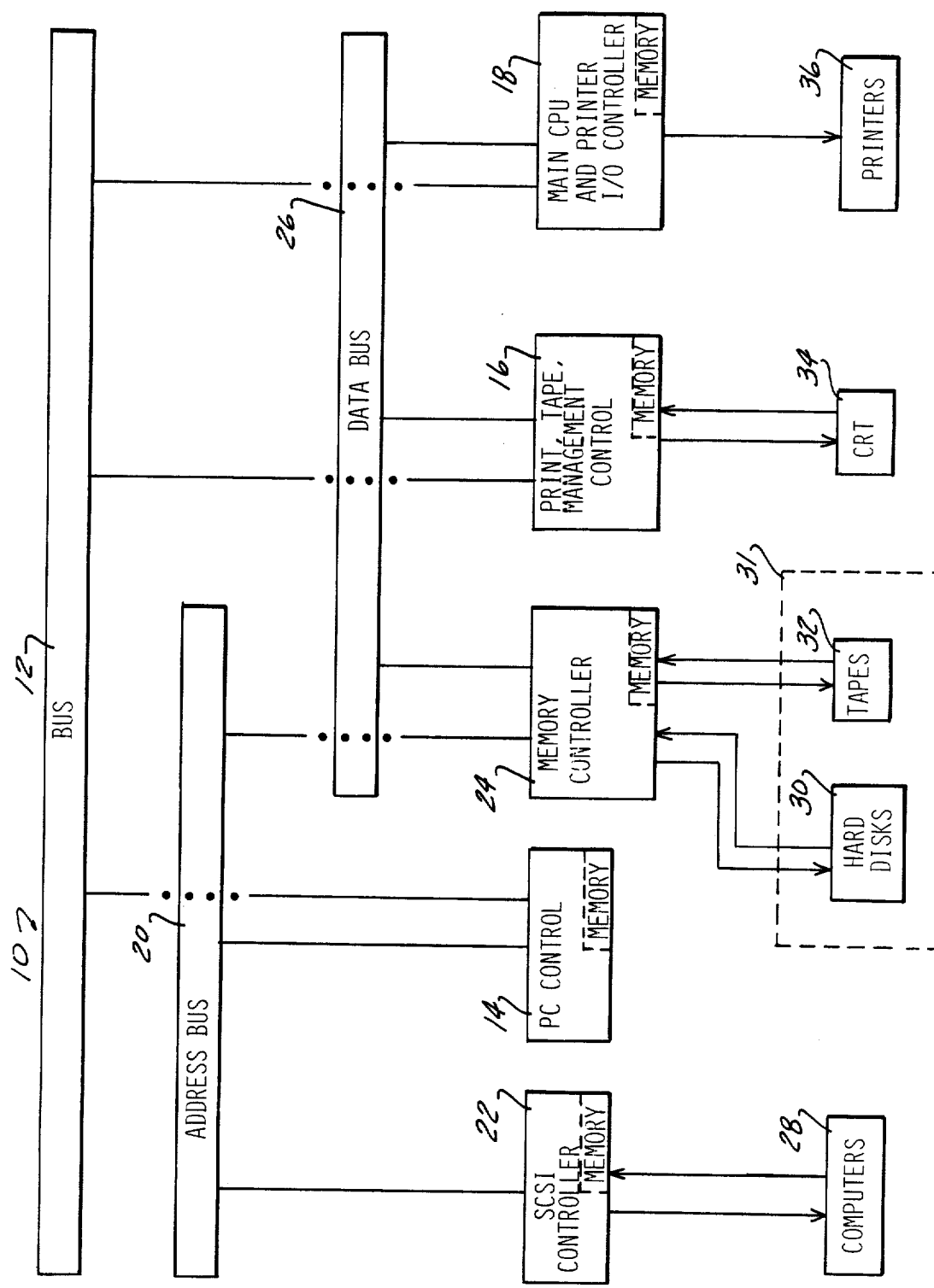
FIG. 1 is the block diagram of the first embodiment which is a multiple computer interface.

In FIG. 1 reference number 10 depicts a block diagram of a multiple computer interface. Reference number 12 is a multi-wire bus which connects a PC control 14, a print, tape, management control 16, and a main CPU and printer I/O controller 18. Address bus 20 connects a computer system interface (SCSI) controller 22, a computer control 14 and a memory controller 24. A data bus 26 connects a memory controller 24, a print, tape, management control 16, and a main CPU and printer I/O controller 18.

The computer control 14 is a conventional CPU containing, for example, 64K of memory and is capable of sending, receiving and executing instructions from any other CPU on the network. The print, tape, management control 16 is a main CPU which contains, for example, 128K of memory and is also capable of sending, receiving and executing instructions from any other CPU.

The main CPU and I/O controller 18 is a conventional CPU containing, preferably, 64K of memory. The controller CPU 18 arbitrates the entire system, and the transfer of data between the inputs and the outputs of the printers 36.

The controller 22 is a Direct Memory Access (DMA) CPU circuit containing, preferably, 256K of memory plus an interface circuit. A DMA CPU can communicate with any interface circuit and is capable of giving and receiving instructions therebetween. A single DMA is capable of connecting multiple interface circuits to the main CPU 18. The memory 24 is a DMA CPU containing 256K of memory and preferably both a hard disk interface circuit and a tape interface circuit.

The controller 22 is a network gateway for multiple computers 28 allowing access to a common library and thus eliminating the need to pass disks around between various computer operators. The memory controller 24 sends, receives and stores information from the memory 31 which consists of, for example, the hard disk 30 and/or the tape drive 32.

The print, tape, management control 16 receives its information from the system CRT 34 which is the operator command center fofthe multiple computer interface network.

The main CPU and printer I/O controller 18 controls the input and the output of the printers 36 via commands from the PC control 14.

Figure 2A:
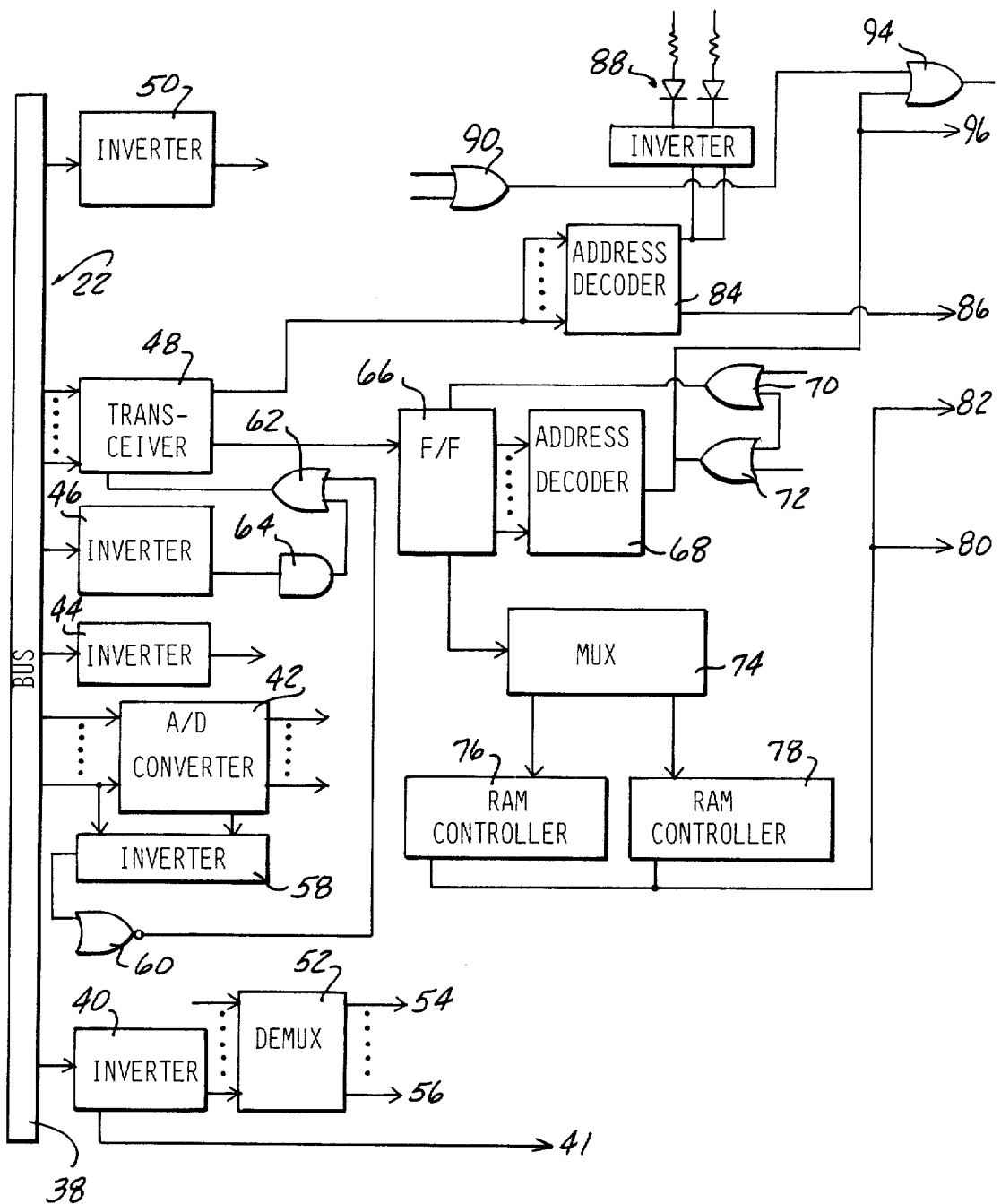

In FIG. 2a reference number 22 depicts a circuit diagram of the computer system interface (SCSI) controller 22. In this circuit diagram a multi-wire bus 38 interconnects an inverter 40, an analog to digital converter 42, inverters 44, and 46, a transceiver 48, and an inverter 50.

The inverter 40 outputs to a demultiplexer 52 containing multiple outputs indicated by reference numbers 54 and 56. The analog to digital converter 42 selects the clock speed for the DMA transfer by outputting to an inverter 58 which in turn supplies the input to a NOR gate 60. The NOR gate 60 supplies the input for an OR gate 62 which in turn outputs to the transceiver 48. The inverters 46 output to an AND gate 64. The output of the AND gate 64 supplies a second input to the OR gate 62.

The transceiver 48 outputs to a flipflop 66 which supplies multiple inputs for an address decoder 68. The clock pulse of flipflop 56 is generated by the output of the NOR gate 70. The NOR gate 70 shares an input with a second NOR gate 72. Flipflop 66 also outputs to a multiplexer 74 which in turn outputs to RAM controllers 76 and 78 which address the DMA RAM array via outputs 80 and 82.

Transceiver 48 also outputs to address decoder 84. Address decoder 84 has a plurality of outputs, one of which is labeled reference number 86 and another of which is connected to the inverter circuit 88 to control user identification. Both OR gate 90 and address decoder 68 output to OR gate 94. In addition, OR gate 94 connects to the output of OR gate 72 labeled 96.

As shown in FIG. 2b, reference number 96 supplies the input to decoder 98 and to driver 100. Reference number 86, also, is the input for the demultiplexer 102. The demultiplexer 102 outputs to the memory 104. The input for the memory 104 is supplied by inputs 80 and 82. The memory 104 outputs to a decoder 106 which contains multiple outputs, and also to driver 100. The memory 104 also connects to a NOR arrangement 110. The input to the NOR arrangement 110 is supplied by the demultiplexer 112.

The output of the inverter 40 in FIG. 2a supplies the input 41 for the OR gate arrangement 114. OR gate 114 outputs to AND gate 116 which in turn outputs to the demultiplexer 112. Also connected to OR gate 114 is a standard gate 118.

The preset for gate 118 is generated by OR gate 120. The clear signal for gate 118 is generated by gate 122. The clear signal for gate 122 is generated by OR gate 124. Inverter 126 supplies inputs to OR gate 124.

Demultiplexer 112 supplies an input to OR gate 128 which in turn outputs to the delay line control 130. The delay control 130 supplies one input to AND gate 132 while a conventional gate 134 supplies another input to AND gate 132. The output of OR gate 136 connects to gate 134, while the input of OR gate 136 is supplied by a standard gate 138. Demultiplexer 112 also outputs to drivers 100 which in turn supply multiple inputs to the 16 bit SCSI processor 140.

In summary, there has been disclosed a unique computer interface network which allows instantaneous transfer of information to multiple computers attached to the network. This enables information to be transferred between the central CPU to any other computers or peripheral devices attached to the network and while such device is performing its program task, other information can be transferred to additional devices on the network. This overcomes previous network systems which required each data transfer to a particular device to be completed before the next data transfer on the network was started.

What is claimed is:

1. A multiple computer interface for connecting a plurality of peripheral central processing units with a data communication network having a management control processing unit, a main memory and an I/O controller central processing unit, the multiple computer interface comprising:
   a first controller central processing unit connected to the plurality of peripheral central processing unit for controlling data transferred to and from the plurality of peripheral central processing units;
   a second control central processing unit, connected to the first controller central processing unit and having a memory and operating a stored control program, for controlling the transfer of data between the first controller central processing unit and the main memory; and
   data communication bus means connected between the first controller central processing unit, the second control central processing unit and the main memory for data transfer therebetween.

2. The multiple computer interface of claim 1 wherein the data communication bus means connects the second control central processing unit, the management control central processing unit and the I/O controller.

3. The multiple computer interface of claim 1 wherein:
   the first controller central processing unit includes a direct access memory means including memory locations associated with each peripheral central processing unit.

* * * * *